US007205985B2

United States Patent
Dodge et al.

(10) Patent No.: US 7,205,985 B2
(45) Date of Patent: Apr. 17, 2007

(54) REFLOWABLE INK

(75) Inventors: Steve Dodge, Sammamish, WA (US); Arin J Goldberg, Woodinville, WA (US); Haiyong Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 573 days.

(21) Appl. No.: 10/770,976

(22) Filed: Feb. 2, 2004

(65) Prior Publication Data

US 2005/0168451 A1    Aug. 4, 2005

(51) Int. Cl.
  *G09G 5/00*    (2006.01)
(52) U.S. Cl. .................... 345/179; 178/19.01
(58) Field of Classification Search ............... 345/173, 345/174, 175, 176, 177, 178, 179, 180, 181, 345/182, 183; 178/19.01, 19.02, 19.03, 19.04, 178/19.05
See application file for complete search history.

(56) References Cited

U.S. PATENT DOCUMENTS 5,596,350 A  *  1/1997  Capps et al. ................. 345/173

* cited by examiner

*Primary Examiner*—Richard Hjerpe
*Assistant Examiner*—Jean Lesperance
(74) *Attorney, Agent, or Firm*—Banner & Witcoff, Ltd.

(57) ABSTRACT

A reflow tool employs layout information from an ink analyzer to determine a relationship between different units of electronic ink, such as words. The reflow tool then collects this relationship information into an ink relationship data structure for later use. When the reflow area containing the electronic ink is resized, or when an edit space is inserted into or deleted from the electronic ink, the reflow tool uses the relationship information from the data structure to intelligently segment the electronic ink for reflow. In this manner, the reflow tool ensures that units of electronic ink, such as words, which are associated with larger groupings of electronic ink, such as paragraphs, are not segmented from those larger groupings to which they belong.

22 Claims, 8 Drawing Sheets

REFLOWABLE INK

FIELD OF THE INVENTION

The present invention relates to techniques for reflowing electronic ink within a reflowable area. Various aspects of the present invention are particularly applicable to reflowing electronic ink within a reflowable area, such as the display area of a graphical user interface, to match the size of the reflowable area or after an edit space has been inserted into a passage of electronic ink.

BACKGROUND OF THE INVENTION

Computing devices which allow a user to enter data with a stylus are becoming more and more popular. This type of computing device, which includes personal digital assistants and tablet personal computers, often allow a user to enter data by writing on a surface with a stylus to create electronic ink. Electronic ink is particularly convenient for users who cannot type quickly with a keyboard, or when the use of a keyboard is impractical.

While electronic ink can be very useful, it also can be more difficult for a computer to edit than typewritten text such as ASCII text. Because no two handwritten characters are alike, a computing device may inaccurately judge where one handwritten character ends and another handwritten character begins. Also, because spacing between both handwritten characters and handwritten words varies from character to character and from word to word, a computer may inaccurately determine the relationship between characters and words. In particular, it is difficult for a computer to reflow ink in the same manner as typewritten text.

For example, as shown in FIG. 1, a user may write a passage of electronic ink 101 into a user interface 103 for creating an electronic mail message. For the writer, the electronic ink 101 appears as a single, unified passage that can be viewed in its entirety within the user interface 103. When the electronic mail message is sent, however, the electronic ink 101 will be displayed according to the user interface employed by the message's recipient. Portions of the passage 101 thus can be hidden or segmented for the recipient. Thus, a person receiving the electronic mail message may view the message with a user interface 201 that is too small to display all of the electronic ink 101 at one time, as shown in FIG. 2. Instead, only a portion of the electronic ink 101 may be displayed. With some types of user interfaces, the recipient can employ a scroll bar 203 to view the hidden portion of the electronic ink 101. By using the scroll bar 203, however, the recipient will hide a portion of the electronic ink 101 that was initially displayed.

To address this problem, other types of user interfaces may reflow the electronic ink 101. More particularly, a recipient's user interface 201' may segment the electronic ink 101 into multiple lines, so that the electronic ink 101 can still be viewed as an entire passage. For typewritten text, this segmentation can easily be performed. The user interface simply identifies a "space" character nearest to the right edge of the interface 201', and segments the text at that space. With electronic ink, however, this process is more difficult. In some cases, the user interface may not be designed for the use of electronic ink. Alternately or additionally, the electronic ink to be displayed may have been created by another system or in another software application. As a result, the user interface 201' may not be able to accurately determine a relationship between the characters and words of the electronic ink 101, the user interface 201' may not segment the electronic ink 101 in a conventional location.

For example, as shown in FIG. 3, the user interface 201' may segment the electronic ink in the middle of a word, making the passage 101 difficult to read. Moreover, even if the user interface 201' properly segments the electronic ink into words, it often cannot segment the electronic ink to properly display larger groupings of electronic ink strokes, such as paragraphs, bullet points or list entries. For example, a user interface 201' may erroneously reflow electronic ink so that the last word in one paragraph is erroneously positioned next to the first word of the subsequent paragraph.

BRIEF SUMMARY OF THE INVENTION

Accordingly, it would be beneficial to allow electronic ink to be properly reflowed like conventional, typewritten text. More particularly, it would be useful to be able to reflow electronic with appropriate segmentation that maintains the association of the units of the ink. Such reflow techniques would allow electronic ink to be properly viewed in display areas that are both larger and smaller than the area in which the electronic ink was originally written. Further, such reflow techniques would allow electronic ink to be accurately reflowed when a writer inserts an edit space into an existing passage of electronic ink, or deletes an edit space from an existing passage of electronic ink.

As used herein, the term "edit space" refers to the space created to insert items into electronic ink, including, but not limited to, the insertion of white space, new or relocated electronic ink, new or relocated typewritten text, image objects like drawings, photographs or pictures, tables, lists, spreadsheets, mathematical formulas or any other inserted item. The term "edit space" as used herein also refers to the space that is removed in order to delete items from electronic ink, include, but not limited to, the deletion of white space, electronic ink, typewritten text, image objects like drawings, photographs or pictures, tables, lists, spreadsheets, mathematical formulas or any other deleted item.

With various examples of the invention, a reflow tool employs layout information from an ink analyzer to determine a relationship between different units of electronic ink, such as words. The reflow tool then collects this relationship information into an ink relationship data structure for later use. When the reflow area containing the electronic ink is resized, or when an edit space is inserted into or deleted from the electronic ink, the reflow tool uses the relationship information from the data structure to intelligently segment the electronic ink for reflow. In this manner, the reflow tool ensures that units of electronic ink, such as words, which are associated with larger groupings of electronic ink, such as paragraphs, are not segmented from those larger groupings to which they belong. According to different examples of the invention, the reflow tool may be hosted by a variety of software applications or controls to properly reflow ink.

DETAILED DESCRIPTION OF THE INVENTION

Example Operating Embodiment

Figure 1:
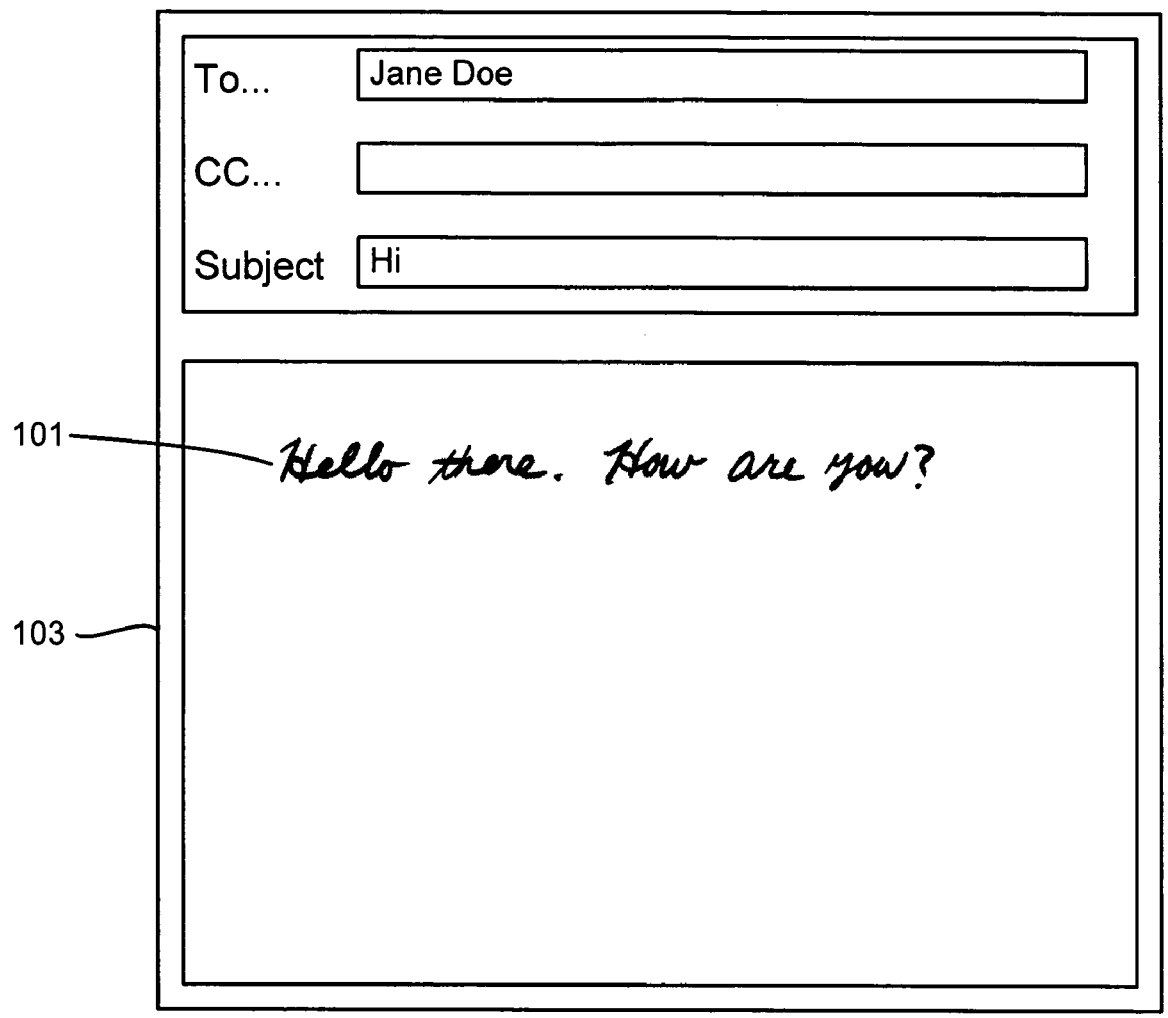
FIG. 1 illustrates a user interface containing electronic ink.
Figure 2:
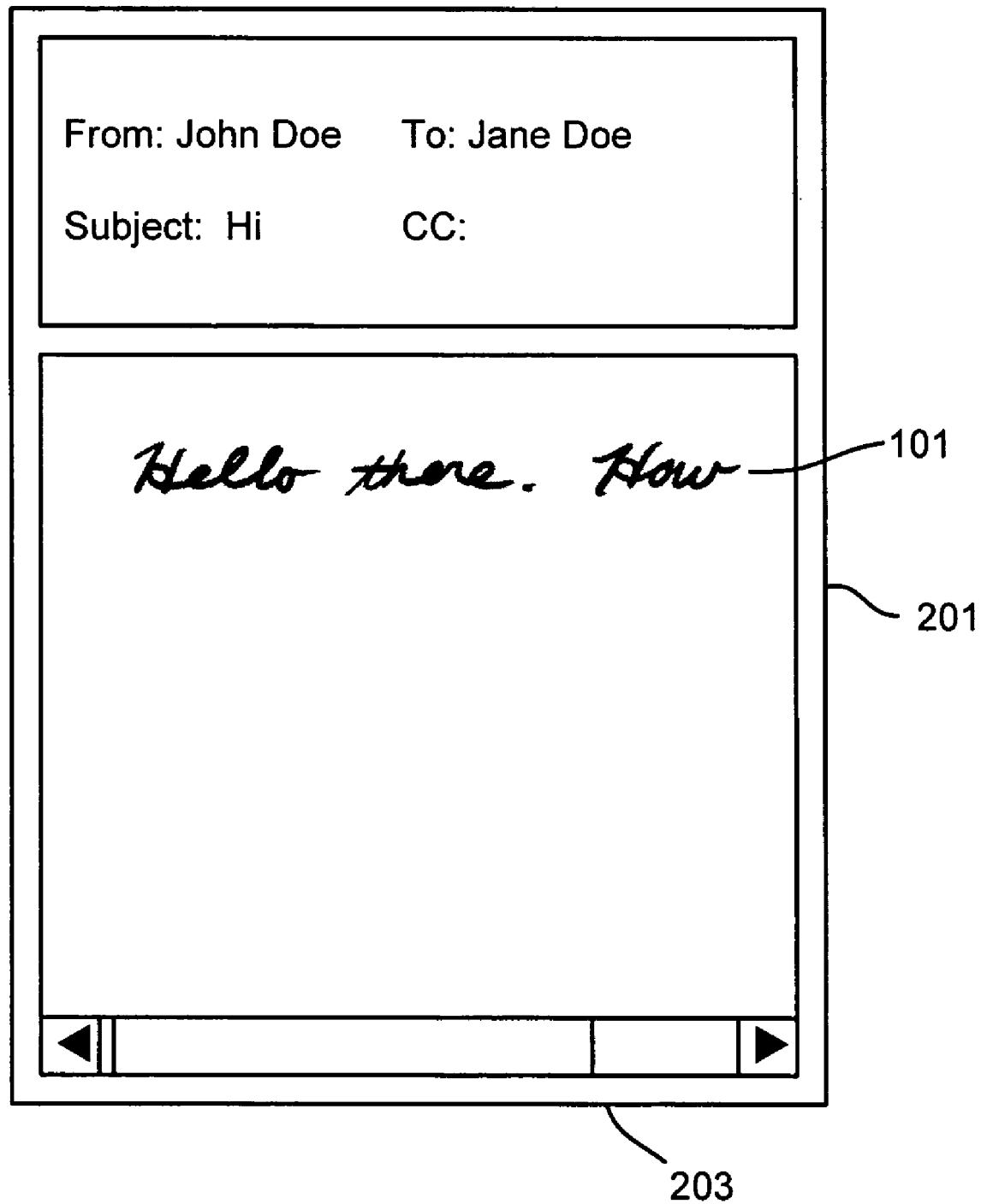
FIGS. 2 and 3 illustrate differently-sized user interfaces displaying the electronic ink illustrated in FIG. 1.
Figure 3:
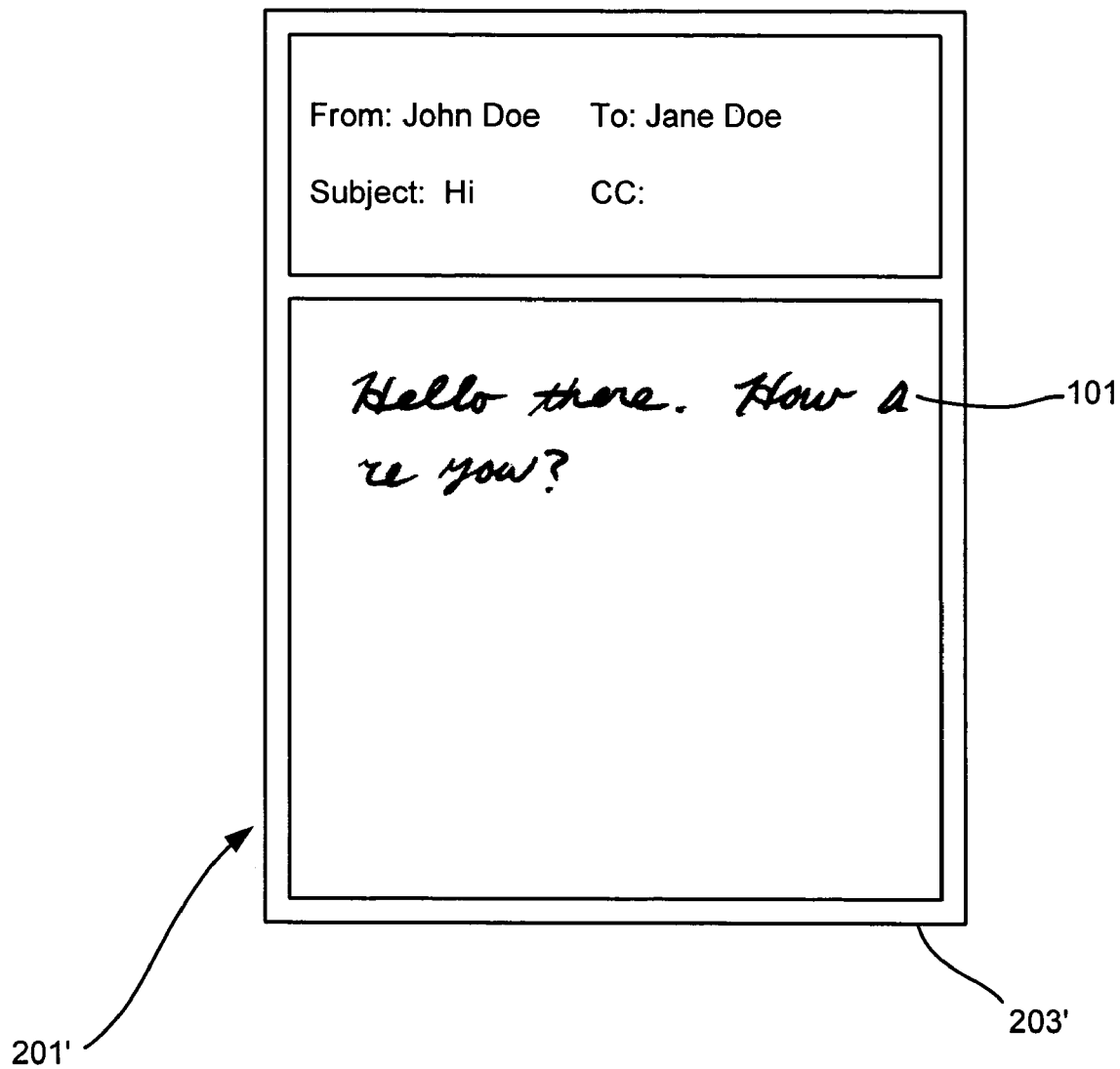
Figure 4:
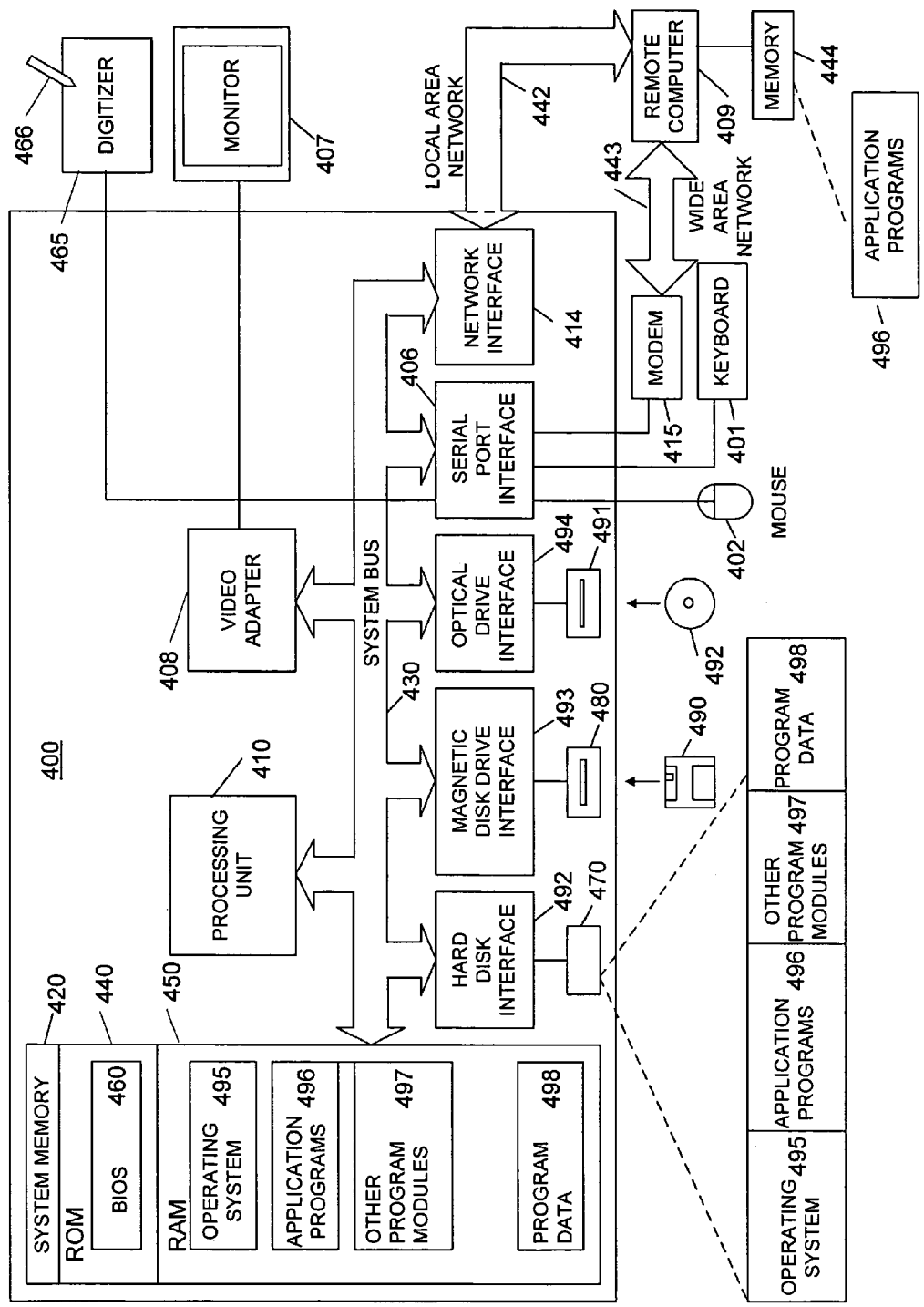
FIGS. 4 and 5 illustrate a computing environment in which various examples of the invention may be implemented.

FIG. 4 illustrates a schematic diagram of a general-purpose digital computing environment that can be used to implement various aspects of the present invention. In particular, FIG. 4 shows a computer 400 of the type that may be employed to implement various examples of the invention. The computing device 400 typically includes at least some form of computer readable media. Computer readable media can be any available media that can be accessed by the computing device 400. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, punched media, holographic storage, or any other medium which can be used to store the desired information and which can be accessed by the operating environment 400.

Communication media typically embodies computer readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As shown in FIG. 4, the computer 400 includes a processing unit 410, a system memory 420, and a system bus 430 that couples various system components including the system memory 420 to the processing unit 410. The system bus 430 may be any of several types of bus structures including a memory bus or memory controller, a peripheral bus, and a local bus using any of a variety of bus architectures. The system memory 420 may include read only memory (ROM) 440 and random access memory (RAM) 450.

A basic input/output system (BIOS) 460 contains the basic routines that help to transfer information between elements within the computer 400, such as during start-up, is stored in the ROM 440. The computer 400 also may include a hard disk drive 470 for reading from and writing to a hard disk (not shown), a magnetic disk drive 480 for reading from or writing to a removable magnetic disk 490, and an optical disk drive 491 for reading from or writing to a removable optical disk 492, such as a CD ROM or other optical media. The hard disk drive 470, magnetic disk drive 480, and optical disk drive 491 are connected to the system bus 430 by a hard disk drive interface 492, a magnetic disk drive interface 493, and an optical disk drive interface 494, respectively. These drives and their associated computer-readable media provide nonvolatile storage of computer-readable instructions, data structures, program modules, and other data for the personal computer 400. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 470, magnetic disk 490, optical disk 492, ROM 440, or RAM 450, including an operating system 495, one or more application programs 496, other program modules 497, and program data 498. A user can enter commands and information into the computer 400 through input devices, such as a keyboard 401 and pointing device 402 (such as a mouse). Other input devices (not shown) may include a microphone, joystick, game pad, satellite dish, scanner, or the like. These and other input devices are often connected to the processing unit 410 through a serial port interface 406 that is coupled to the system bus 430, but they also may be connected by other interfaces, such as a parallel port, game port, or a universal serial bus (USB), and the like. Further still, these devices may be coupled directly to the system bus 430 via an appropriate interface (not shown).

A monitor 407 or other type of display device also may be connected to the system bus 430 via an interface, such as a video adapter 408. In addition to the monitor 407, personal computers typically include other peripheral output devices (not shown), such as speakers and printers. In one example, a pen digitizer 465 and accompanying pen or stylus 466 are provided in order to digitally capture freehand input. Although a connection between the pen digitizer 465 and the serial port interface 406 is shown in FIG. 4, in practice, the pen digitizer 465 may be directly coupled to the processing unit 410, or it may be coupled to the processing unit 410 in any suitable manner, such as via a parallel port or another interface and the system bus 430 as is known in the art. Furthermore, although the digitizer 465 is shown separate from the monitor 407 in FIG. 4, the usable input area of the digitizer 465 may be co-extensive with the display area of the monitor 407. Further still, the digitizer 465 may be integrated in the monitor 407, or it may exist as a separate device overlaying or otherwise appended to the monitor 407.

The computer 400 can operate in a networked environment using logical connections to one or more remote computers, such as a remote computer 409. The remote computer 409 can be a server, a router, a network PC, a peer device or other common network node, and it typically includes many or all of the elements described above relative to the computer 400, although for simplicity, only a memory storage device 411 has been illustrated in FIG. 4. The logical connections depicted in FIG. 4 include a local area network (LAN) 412 and a wide area network (WAN) 413. Such networking environments are commonplace in offices, enterprise-wide computer networks, intranets, and the Internet, using both wired and wireless connections.

When used in a LAN networking environment, the computer 400 is connected to the local area network 412 through a network interface or adapter 414. When used in a WAN networking environment, the personal computer 400 typically includes a modem 415 or other means for establishing a communications link over the wide area network 413, such as the Internet. The modem 415, which may be internal or external to the computer 400, may be connected to the system bus 430 via the serial port interface 406. In a networked environment, program modules depicted relative to the personal computer 400, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 4 environment shows one example of an operating environment for various embodiments of the invention, it should be understood that other computing environments also may be used. For example, one or more examples of the present invention may use an environment having fewer than all of the various aspects shown in FIG. 4 and described above, and these aspects may appear in various combinations and subcombinations that will be apparent to one of ordinary skill.

Figure 5:
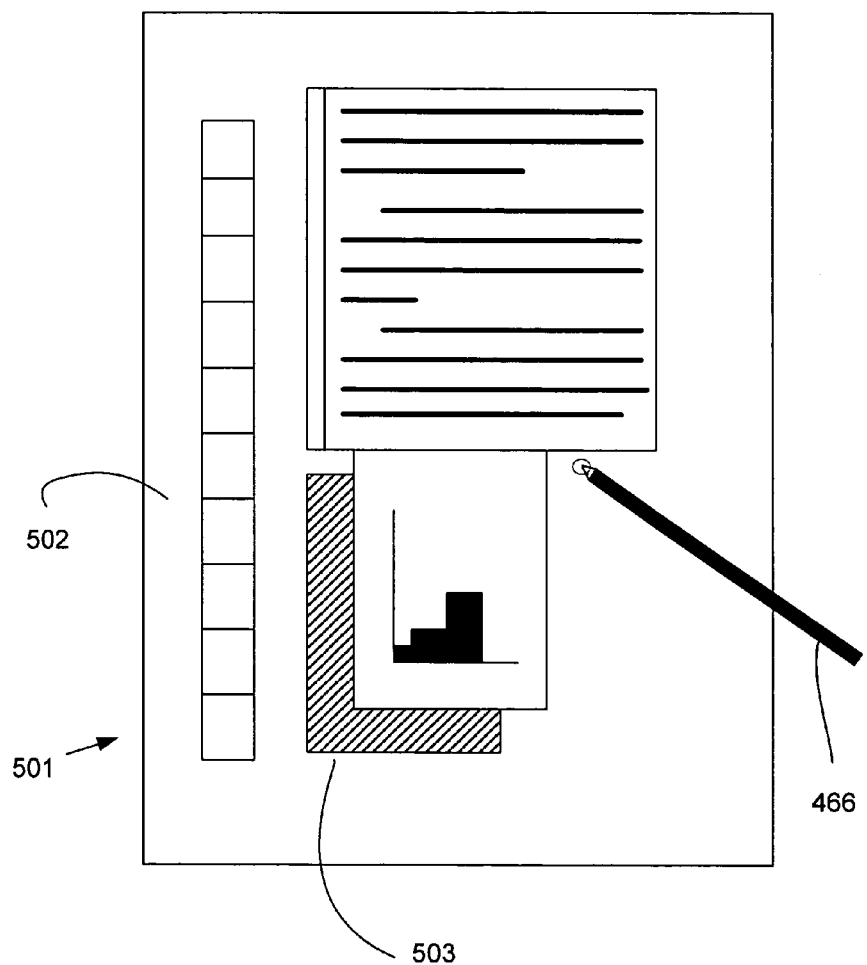

FIG. 5 illustrates a pen-based personal computer (PC) 501 that can be used in accordance with various aspects of the present invention. Any or all of the features, subsystems, and functions in the system of FIG. 4 can be included in the computer of FIG. 5. The pen-based personal computer system 501 includes a large display surface 502, e.g., a digitizing flat panel display, such as a liquid crystal display (LCD) screen, on which a plurality of graphical user interfaces 503, such as windowed graphical user interfaces, is displayed. Using stylus 466, a user can select, highlight, and write on the digitizing display area. Examples of suitable digitizing display panels include electromagnetic pen digitizers, such as pen digitizers available from Mutoh Co. (now known as FinePoint Innovations Co.) or Wacom Technology Co. Other types of pen digitizers, e.g., optical digitizers, and touch-sensitive digitizers may also be used. The pen-based computing system 501 interprets gestures made using stylus 466 in order to manipulate data, enter text, and execute conventional computer application tasks, such as creating, editing, and modifying spreadsheets, word processing programs, and the like.

The stylus 466 may be equipped with buttons or other features to augment its capabilities. In one example, a stylus 466 could be implemented as a "pencil" or "pen", in which one end constitutes a writing portion. The other end of the stylus 466 then constitutes an "eraser" end, which, when moved across the display, indicates portions of electronic ink on the display that are to be erased. Other types of input devices, such as a mouse, trackball, keyboard, or the like also could be used. Additionally, a user's own finger could be used for selecting or indicating portions of the displayed image if the display is a touch-sensitive or proximity-sensitive display. Consequently, the term "user input device," as used herein, is intended to have a broad definition and encompasses many variations on well-known input devices.

In various examples, the system provides an ink platform as a set of COM (component object model) services that an application program can use to capture, manipulate, and store ink. The ink platform also may support a mark-up language including a language like the extensible markup language (XML). Further, the system may use DCOM as another implementation. Yet further implementations may be used including the Win32 programming model and the .Net programming model from Microsoft Corporation. These platforms are commercially available and known in the art. It should also be appreciated that other embodiments of the invention may operate with an ink platform provided on still other operating systems, such as Linux, Unix, or Macintosh operating systems.

In addition to use with full performance pen-based computing systems or "tablet PCs" (e.g., convertible laptops or "slate" type tablet PCs), aspects of this invention can be used in conjunction with other types of pen-based computing systems and/or other devices that accept data as electronic ink and/or accept electronic pen or stylus input, such as: hand-held or palm-top computing systems; personal digital assistants; pocket personal computers; mobile and cellular telephones, pagers, and other communication devices; watches; appliances; and any other devices or systems that include a monitor or other display device and/or a digitizer that presents printed or graphical information to users and/or allows input using an electronic pen or stylus, or which can process electronic ink collected by another device (e.g., a conventional desktop computer that can process electronic ink collected by a tablet PC).

Reflow Tool

Figure 6:
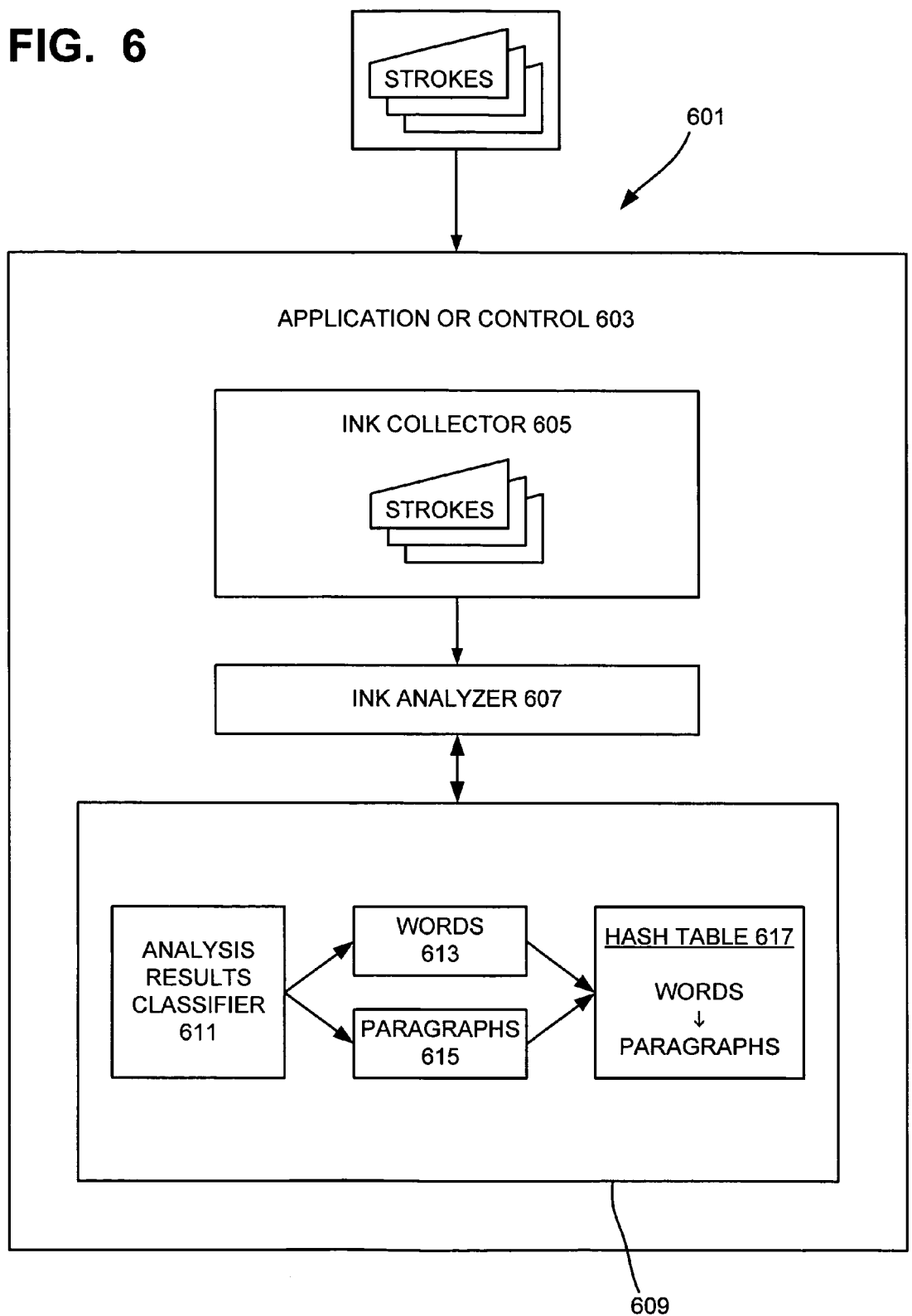
FIG. 6 illustrates an example of a reflow tool according to various embodiments of the invention.

Turning now to FIG. 6, this figure illustrates a computing application environment 601 including a reflow tool according to various embodiments of the invention. As seen in this figure, the application environment 601 includes an application or control 603, which is capable of receiving user input in the form of electronic ink. The application or control 603 then hosts or otherwise employs an ink collector 605, an ink analyzer 607, and a reflow tool 609. Typically, the application or control 603 will display electronic ink in a display area of a user interface. The area within the display area in which the electronic ink will be reflowed will be referred to as the reflow area. For various embodiments of the invention, the reflow area will be in the display area, however, the reflow area may be a subset of the display area.

When a user enters electronic ink strokes into the user interface of the software application or control 603, the ink collector 605 collects the electronic ink strokes and provides them to the ink analyzer 607. The analyzer 607 then analyzes the layout of the electronic ink strokes, in order to determine various relationships between the electronic ink strokes. For example, the ink analyzer 607 will determine which electronic ink strokes should be grouped together to form a character.

Further, the ink analyzer 607 will organize electronic ink strokes into discrete units. As employed herein, the term "discrete unit" refers to the smallest grouping of ink strokes that should not be segmented during reflow. For example, with Western languages, the ink analyzer 607 may organize electronic ink strokes into discrete units of individual words. With East Asian languages, however, the ink analyzer 607 may designate individual characters as the smallest discrete units of electronic ink strokes, depending upon the language syntax rules being employed. Still further, the electronic ink analyzer 607 will typically organize the discrete units of electronic ink strokes into larger associations. For example, the ink analyzer 607 may organize words of electronic ink into paragraphs, bullet points, list entries, or other individual groups of discrete electronic ink units.

It should be noted that, with various embodiments of the invention, the ink analyzer (sometimes also referred to as a "parser") may be incorporated within the reflow tool 609. Various examples of electronic ink analyzers are known in the art, and thus will not be discussed in detail. In some arrangements, however, the ink analyzer 607 will maintain only an internal complete record of the various determined relationships between electronic ink strokes. For example, while the ink analyzer 607 may maintain an internal data structure, such as a tree, that reflects word, line, and paragraph relationships between the electronic ink strokes, the entire content of this tree structure will not be available outside of the ink analyzer 607. Instead, the ink analyzer may only be able to provide analysis results for the electronic ink in a single granularity. For example, the ink analyzer may be able to provide analysis results grouping ink strokes into words, analysis results grouping ink strokes into lines, and analysis results grouping ink strokes into paragraphs, but not be able to provide any two sets of results concurrently.

Typically, the ink analyzer 607 will analyze (or reanalyze) the electronic ink strokes whenever there is a change to the electronic ink strokes. For example, the ink analyzer may analyze the electronic ink when a stroke is added, when a stroke is deleted, or when strokes are moved from one location to another. (New, unanalyzed ink is sometimes referred to as "dirty" ink.) It should also be noted that the ink analyzer 607 may analyze the entire collection of electronic ink, or, alternatively, only the portion of the electronic ink that has been changed. Thus, the ink analyzer 607 will analyze or reanalyze electronic ink whenever an edit space is inserted into or deleted from the electronic ink.

With the embodiment of the invention illustrated in FIG. 6, the reflow tool 609 is operated by a worker thread spawned by the application or control 603. This thread is separate from the primary thread upon which the application or control 603 itself operates, thereby allowing the reflow tool 609 to operate as a background process. In various examples of the invention, this worker thread will only activate or "wake up" periodically. For example, the worker thread may activate once every second. Of course, the worker thread may activate more or less frequently as desired. Further, with some embodiments of the invention, the worker thread may activate only when the processor load for other processes drops below a threshold value.

Still other embodiments of the invention may employ a single thread for operating both the application or control 603 and the reflow tool 609. With these embodiments, for example, the reflow tool 609 might perform analysis and reflow of electronic ink during a repaint or resize of a user interface for the application or control 603. Alternatively the reflow tool 609 might partition the analysis and reflow operations into segments, and then performed these operations during "idle" time in the application's primary (or only) thread.

When the reflow tool 609 activates, it retrieves any new analysis results from the ink analyzer 607. More particularly, the reflow tool 609 determines whether the ink analyzer 607 has updated the analysis results since the reflow tool 609 was last activated. It should be noted that, with some implementations of the ink analyzer 607, the ink analyzer 607 will be able to notify external software objects of updated analysis results. The reflow tool 609 can then use this notification mechanism to determine if it needs to retrieve updated analysis results from the ink analyzer 607.

With other implementations of the ink analyzer 607, however, the ink analyzer 607 will not have a notification mechanism to notify external software objects of updated analysis results. Instead, the ink analyzer 607 may employ an alternate mechanism that the reflow tool 609 can use to determine when updated analysis results are available. For example, the ink analyzer 607 may set a flag value whenever the electronic ink is changed. While this flag will be set more often than updated analysis results are actually produced (such as when a change does not alter an earlier layout analysis of the electronic ink), the flag will still indicate each time that updated analysis results have been produced by the ink analyzer 607. Accordingly, the reflow tool 609 may alternately or additionally access such a flag value to determine whether to retrieve updated analysis results from the ink analyzer 607.

If updated analysis results are available from the ink analyzer 607, the reflow tool 609 will obtain the updated analysis results. For example, if the reflow tool 609 reflows electronic ink so as to position words within their intended paragraphs, then the reflow tool 609 may employ a pair of utility functions to retrieve both analysis results 613 identifying the groups of ink strokes that form words and the analysis results 615 identifying the groups of ink strokes that form paragraphs. The analysis results classifier 611 then populates a data structure 617 using the separately obtained analysis results so as to associate each word with a paragraph.

For example, the analysis results classifier 611 may process each word identified in the word analysis results 613 by comparing the first stroke of that word against the set of strokes identified for in each paragraph. When a match is found, the analysis results classifier 611 may then add an entry identifying the paragraph to a position in a lookup "hash" table corresponding to the word. Once the word has been associated with a paragraph in this manner, the analysis results classifier 611 will then continue on to process the next word. Of course, it should be appreciated that various embodiments of the invention may employ alternate algorithms to associate on grouping of ink strokes, such as a word, with another grouping of ink strokes, such as a paragraph. Also, while the illustrated example recreates the entire hash table 617 as each set of updated analysis results are obtained, various embodiments of the invention may analyze the updated results and modify only the portions of the data structure corresponding to changes in the previous analysis results.

It also should be appreciated that, while the data structure 617 in the illustrated example is a hash table, with alternate embodiments of the invention, the analysis results classifier 611 may employ any desired type of data structure to associate one grouping of ink strokes with another grouping of ink strokes. Also, the analysis results classifier 611 may associate alternate or additional groups of ink strokes than the specific examples discussed above. For example, the analysis results classifier 611 may alternately or additionally associate words with bullet points or list entries. Further, the analysis results classifier 611 may associate different discrete units of electronic ink, such as individual characters, where desired.

As previously noted, various implementations of the ink analyzer 607 will not provide other software objects with analysis results that identify relationships between different groupings of ink strokes. If, however, the ink analyzer 607 does not provide such analysis results, then the analysis results classifier 611 and the data structure 167 may be simplified or omitted altogether. Instead, the reflow tool 609 may obtain the associations between different groupings of electronic ink directly from the ink analyzer 607. For example, if the ink analyzer 607 provides other software objects with a tree structure showing the relationship between words, lines and paragraphs of electronic ink, then the reflow tool 609 may use this information rather than creating a separate data structure to correlate groupings of electronic ink strokes.

Once the reflow tool 609 has obtained the relationship information associating groupings of ink strokes, the reflow tool 609 can properly reflow the ink if, for example, the user interface displaying the electronic ink for the application or control 603 is resized, or if an edit space is inserted into or deleted from the electronic ink. More particularly, if the application or control 603 detects that the display user interface has been resized, or that an edit space has been inserted into or deleted from the electronic ink, the application or control 603 tasks the reflow tool 609 to reflow the electronic ink. With still other embodiments of the invention, the reflow tool 609 may alternately or additionally detect the change in the electronic ink from the ink analyzer 607, and automatically reflow the electronic ink.

Figure 7A:
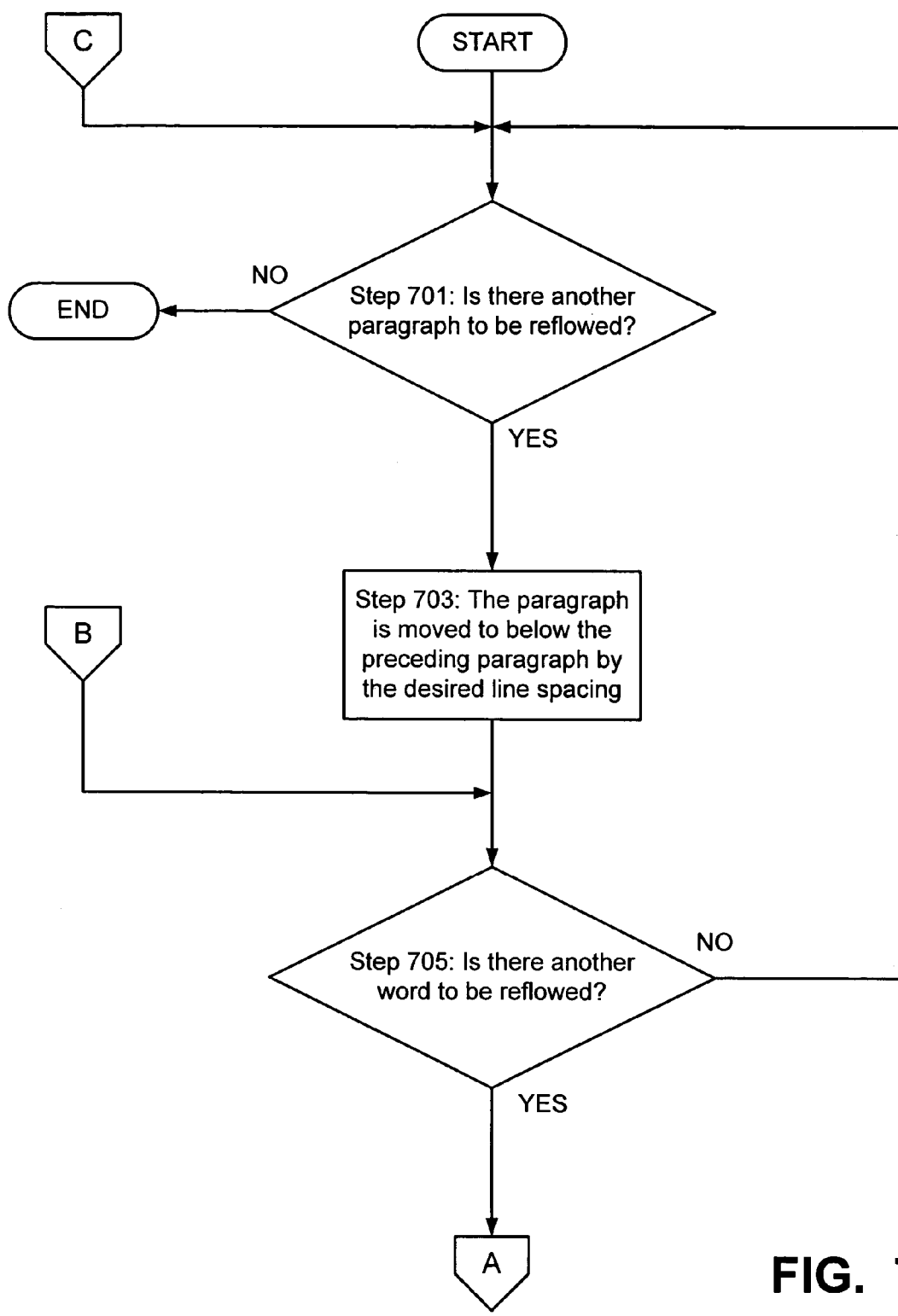
FIGS. 7A and 7B together illustrate a flowchart describing a reflow process according to various embodiments of the invention.
Figure 7B:
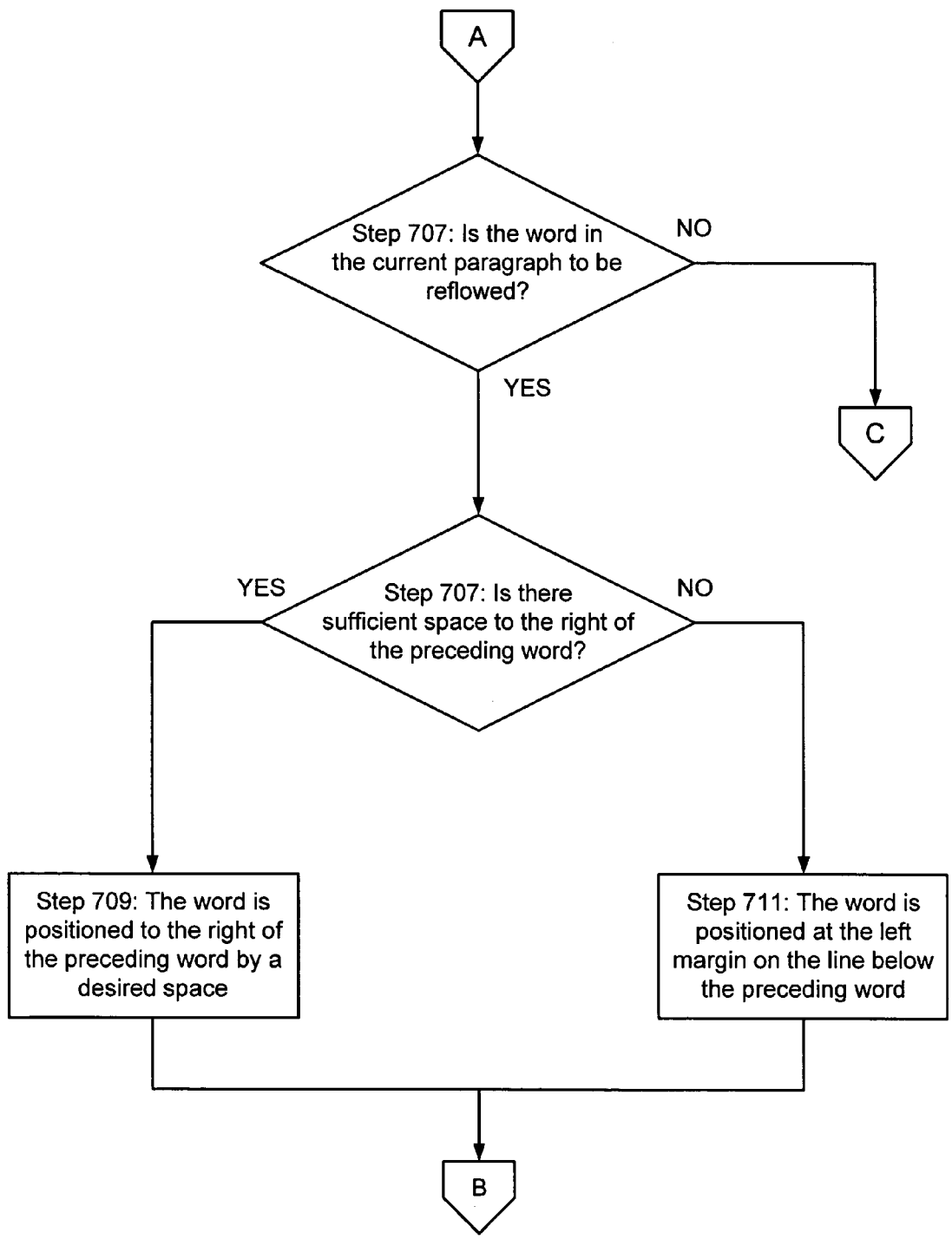

FIGS. 7A and 7B illustrate one technique that may be used by the reflow tool 609 to reflow the electronic ink contained in a reflow area. First, in step 701, the reflow tool 609 determines if there is another paragraph within the reflow area to be reflowed. If there are no more paragraphs to be reflowed, then the reflow process ends. If, on the other hand, there is another paragraph to be reflowed within the reflow area (such as when the reflow process has just started), then the reflow process continues onto step 703. In step 703, the reflow tool 609 moves the paragraph to be reflowed below the preceding paragraph (or to a desired margin point if there is no preceding paragraph) by the desired line spacing. That is, the upper boundary for the paragraph to be reflowed is positioned in the reflow area at a desired line height below the lower boundary for the preceding paragraph. With various embodiments of the invention, the boundary for each paragraph may be determined by forming a bounding box around the paragraph. Defining a bounding box around each paragraph allows the desired spacing between adjacent paragraphs to be easily and consistently determined without complex calculations.

Next, in step 705, the reflow tool 609 determines if there is a remaining word in the electronic ink to be reflowed. If there is not, then the process returns to step 701. If there is another word to be reflowed, then, in step 707, the reflow tool 609 determines if the word is in the current paragraph to be reflowed. If the word is not in the current paragraph, then the process returns to step 705, to determine if there are any more electronic ink words in the reflow area to be reflowed. If, however, the word is in the current paragraph to be reflowed, then, in step 707, the reflow tool 609 determines if there is sufficient space in the reflow area adjacent to (e.g., to the right of) the preceding word to place the current word to be reflowed.

If there is sufficient space to the right of the preceding word in the reflow area, then in step 709 the word to be reflowed is positioned adjacent to (e.g., to the right of) the preceding word in the reflow area by a desired space. With alternate embodiments of the invention, additional space may be provided to the right of each reflowed word after it has been successfully reflowed, to ensure that any subsequently positioned words will be properly spaced from the reflowed word. Of course, still other techniques for ensuring that adjacent words are separated by a space may be employed.

Returning now to FIG. 7B, if there is not sufficient space to the right of the preceding word in step 709, then in step 711 the word to be reflowed is positioned at the left margin of the line in the reflow area below the preceding word. Again, additional space may be provided to the right of the reflowed word to ensure that any subsequently positioned words will be properly spaced from the reflowed word. In either case, when the word to be reflowed is positioned in the reflow area, the process returns to step 705. In this manner, the reflow tool 609 can accurately reflow each word in a collection of electronic ink, such that the electronic ink is properly displayed within the reflow area 609.

As with the paragraphs, the positioning of the words may be determined using bounding boxes for each word. Accordingly, with various embodiments of the invention, the tool 601 may determine the space between reflowed words based upon the distance between the bounding boxes for each word.

It should also be noted that various embodiments of the invention may allow even angled electronic ink to be reflowed. For example, with some embodiments of the invention, the reference direction for the electronic ink may be considered for the reflow process. With this embodiment, the reflow process (such as the reflow process discussed in detail above) may reflow the electronic ink using a frame of reference relative to the electronic ink rather than to the user interface displaying the ink. Thus, for example, bounding boxes for the paragraphs and words used to reflow the electronic ink can be oriented in a direction corresponding to the angle of the electronic ink, rather than to the user interface. The boundaries of the user interface can then be employed to determine when a reflowed word is added to an existing line of electronic ink or repositioned to begin a new line of electronic ink.

Still other embodiments of the invention may detect when a word or phrase of electronic ink is written at an angle relative to the rest of a passage of electronic ink. With these embodiments of the invention, the angle of the word or phrase may be changed to correspond with the rest of the electronic ink passage before being reflowed. With both the reflow of angled electronic ink and the correction of the angle of a word or phrase of electronic ink before reflow, the angle of the electronic ink may be determined/and or changed by the ink analyzer 607. With still other embodiments of the invention, however, the angle of the electronic ink may be determined/and or changed by the reflow tool 609 itself.

Moreover, while the various embodiments of the invention described above reflow electronic ink using horizontal lines, still other embodiments of the invention may reflow electronic ink using vertical lines. For example, some Eastern languages are written vertically. Accordingly, ink units (e.g., pictographic characters) written in these languages will be reflowed along vertical lines rather than horizontal lines. Also, while the various embodiments of the invention described above reflow electronic ink in a left-to-right direction, still other embodiments of the invention may reflow electronic ink in a right-to left direction (i.e., a reflowed ink unit is positioned to the left of a previously reflowed ink unit, or moved to the rightmost position of a subsequent line). Again, some Eastern languages are written in a right-to-left direction rather than in a left-to-right direction. Accordingly, ink units (e.g., pictographic characters) written in these languages may be reflowed in a right-to-left direction rather than in a left-to-right direction.

Application Programming Interface

According to various embodiments of the invention, the ink reflow tool 609 may be implemented to include an application programming interface that can be invoked by a host application to reflow electronic ink. The application programming interface may be invoked, for example, when new electronic ink is inserted into or deleted from the reflow area, or when the size of the reflow area is changed. In this manner, the reflow application programming interface (API) may be commonly invoked by a variety of different host applications.

One example of such an application programming interface will now be discussed. According to various embodiments of the invention, the application programming interface may, for example, include an InkReflowService class, which employs an InkReflowServiceEventsArgs class, an InkReflowServiceInkRearrangedEvent Handler class, and an InkReflowServiceInkParsedEventHandler class.

The InkReflowService class centralizes the ink reflow operation, in that it allows a variety of different applications to employ the ink reflow operation by invoking the components of this class. With various examples of the invention, an application may employ alternate techniques for using the components of the InkReflowService class. For example, with some embodiments of the invention, the application may instantiate the class and subscribe to events that will inform the application when analysis of the electronic ink is complete. These events may include, for example, an InkReflowServiceInkRearranged component which informs the host application when electronic ink has been rearranged, and an InkReflowServiceInkParsed event, which notifies the host application when the electronic ink has been parsed. This type of notification informs the host application when the user interface can be refreshed or updated, which may include repainting the newly-reflowed ink, or enabling scrollbars or other user interface tools. With still other embodiments of the invention, an application may alternately or additionally define a new class that derives from the InkReflowService and employs an OnInkRearranged and an OnInkParsed methods which are called to notify the host application that ink has been analyzed and that parsing results of the ink are available.

The components of the InkReflowService class then are used to control the reflow operation. For example, this class may have one or more methods that allow the invoking application to interact with the electronic ink being reflowed. These components may include, for example, a RearrangeInk method, which allows the host application to synchronously request the ink to be reflowed. The InkReflowService class may further include an UpdateInk method, which refreshes the electronic ink associated with the object, and a RemoveInk method, which removes ink from the reflow service. The parameters of both the UpdateInk method and the RemoveInk method may be, for example, a stroke value indicating the ink stroke to refresh and an invalidate flag value, which may be used to delay re-parsing of the electronic ink associated with the object. Such a delay may be useful where, for example, a series of changes are being made to the electronic ink, and re-parsing on every change would reduce the performance of the ink-rendering software application implementing the reflow tool. This class may also include an AddStroke method, which adds a stroke to the electronic ink associated with the object if the ink is within the reflow area. The parameters of this method will be the stroke to be added.

Depending upon the platform on which the ink reflow service is employed, the InkReflowService class may include several additional methods, such as a constructor method for creating an object to manage the reflow of ink, and a dispose method for disposing of the object when the reflow service is no longer needed. The parameters of the constructor method would include, for example, an ink object. For various embodiments of the invention, the constructor method might also include a parameter defining an ink rectangle in which reflow will occur. The InkReflowService class may also include a DrawClassifications method, which draws grouping/classification hints based on parsing results. Still other embodiments of the invention may provide various mechanisms allow the reflow component to provide end-user guidance on where to write new electronic ink. For example, the InkReflowService class may also include a DrawGuides method, which can be used to display guidelines in the reflow area corresponding to parsing settings.

If the InkReflowService class executes on a secondary worker thread as described in detail above, then this class may also include a Start method for staring the reflow service and a Stop method for stopping the reflow service. The InkReflowService class may also include a method for obtaining and setting a rectangle property that defines the reflow area. The units for the rectangle (e.g., pixels, ink units, etc.) may depend upon the platform used to an implement the reflow service. For example, with some platforms, the InkReflowService class may include a GetPixelRectangle method, which returns the pixel rectangle defining the reflow area. This method may have a parameter, e.g., defining the handle for the user interface window in which the electronic ink is being rendered. Still further, the InkReflowService class may include a SetPixelRectangle method, which sets the pixel rectangle defining the reflow area. This method may also have a parameter, e.g., defining the handle for the user interface window in which the electronic ink is being rendered, and will additionally include a parameter defining the pixel-based rectangle. Advantageously, the SetPixelRectangle and the GetPixelRectangle may provide a shortcut for converting between ink space units and pixel units.

The InkReflowService class may also have several properties. For example, with various embodiments of the invention, the InkReflowService class may include a LineHeight property to guide parsing and control layout. This class may also include a LinePadding property for controlling the "top" of the word on each line. Again, the value of this property may be defined in any desired unit, depending upon the particular platform implementation, such as, e.g., pixels or ink space units. This class may further have a WordPadding property, which returns or sets the space inserted between each "word" during layout, and a MarginPadding property that returns or sets the space reserved at the beginning and end of each line. The value of each of these properties may also be defined in any desired unit, depending upon the particular platform implementation, such as, e.g., in pixels or ink space units.

The InkReflowService class may also have an InkRectangle property, which returns or sets the reflow area in which wrapping occurs, and an InkDirty property, which indicates whether the electronic ink has been changed. This property might alternatively be implemented with an event notification or not present at all (e.g., in the case where the synchronous RearrangeInk method would be sufficient to perform this task). Still further, this class may have an IdleTimeout property, which is the timeout for the background thread. This property sets the number of milliseconds for which the background thread will sleep before waking up to check whether the ink has been changed. A smaller value for this property will make the reflow process appear automatic. With sufficient eventing from the Ink object passed in the constructor, the reflow service would not need the dirty and timeout properties at all, since the Ink itself would provide sufficient notifications.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method of reflowing ink, comprising:
    analyzing electronic ink containing one or more ink units, so as to associate each ink unit with an ink group; and
    reflowing the electronic ink such that, for each ink group, each ink unit associated with the ink group is contained within a reflowable area, wherein reflowing the ink includes, for each ink group
        determining whether each ink unit can be positioned adjacent to a previous ink unit on a current line without exceeding a boundary of the reflowable area, and
        if an ink unit can be positioned adjacent to a previous ink unit on the current line without exceeding a boundary of the reflowable area, then positioning the ink unit adjacent to the previous ink unit on the current line, and
        if an ink unit cannot be positioned adjacent to the previous ink unit on the current line without exceeding a boundary of the reflowable area, then positioning the ink unit at a beginning of a new line.

2. The method recited in claim 1 wherein reflowing the ink includes, for each ink group, positioning an ink group at a specified distance from a previous ink group.

3. The method recited in claim 1 further comprising:
    organizing a plurality of ink strokes into the one or more ink units.

4. The method recited in claim 1 wherein each ink unit is a word and each ink group is a paragraph.

5. The method recited in claim 1 further comprising
    detecting that the reflowable area has been resized; and
    in response to detecting that the reflowable area has been resized, reflowing the ink.

6. The method recited in claim 1 further comprising
    detecting that an edit space has been inserted into or deleted from the electronic ink; and
    in response to detecting that the reflowable area has been resized, reflowing one or more ink units in the electronic ink.

7. The method recited in claim 6 wherein the one or more ink units are subsequent to the edit space.

8. The method recited in claim 7 wherein an ink unit subsequent to an edit space is positioned to the right of the edit space along a horizontal line or below the edit space.

9. The method recited in claim 7 wherein an ink unit subsequent to an edit space is positioned to the left of the edit space or below the edit space along a vertical line.

10. The method recited in claim 1 further comprising:
    defining a bounding box for each ink unit; and
    reflowing each ink unit within the reflowable area by determining a desired distance between the bounding box for each positioned ink unit.

11. The method recited in claim 1 further comprising:
    defining a bounding box for each ink group; and
    reflowing each ink group within the reflowable area by determining a desired distance between the bounding box for each positioned ink unit.

12. The method recited in claim 1, further comprising reflowing the each ink unit at an angle corresponding to an angle of writing for the electronic ink.

13. An apparatus for reflowing electronic ink, comprising:
    a reflow tool that obtains an association of each ink unit in a passage of electronic ink with an ink group; and
    reflows the electronic ink such that, for each ink group, each ink unit associated with the ink group is contained within a reflowable area, wherein reflowing the ink includes, for each ink group
        determining whether each ink unit can be positioned adjacent to a previous ink unit on a current line without exceeding a boundary of the reflowable area, and
        if an ink unit can be positioned adjacent to a previous ink unit on the current line without exceeding a boundary of the reflowable area, then positioning the ink unit adjacent to the previous ink unit on the current line, and
        if an ink unit cannot be positioned adjacent to the previous ink unit on the current line without exceeding a boundary of the reflowable area, then positioning the ink unit at a beginning of a new line.

14. The apparatus recited in claim 13, wherein the reflow tool includes an analysis results classifier that determines an ink group associated with each ink unit, and
    a hash table that stores the association of each ink unit with an ink group.

15. The apparatus recited in claim 14, wherein the analysis results classifier determines an ink group associated with each ink unit by comparing a stroke of each ink unit against a set of strokes corresponding to each ink group.

16. The apparatus recited in claim 14, further comprising an ink analyzer that organizing electronic ink stroke into ink units and ink groups.

17. The apparatus recited in claim 16, further comprising an application or control that invokes the ink analyzer and the reflow tool.

18. One or more computer readable storage media having computer-executable instructions that, when executed by a processor, perform a method of reflowing ink, comprising:
    analyzing electronic ink containing one or more ink units, so as to associate each ink unit with an ink group; and
    reflowing the electronic ink such that, for each ink group, each ink unit associated with the ink group is contained within a reflowable area, wherein reflowing the ink includes, for each ink group
        determining whether each ink unit can be positioned adjacent to a previous ink unit on a current line without exceeding a boundary of the reflowable area, and
        if an ink unit can be positioned adjacent to a previous ink unit on the current line without exceeding a boundary of the reflowable area, then positioning the ink unit adjacent to the previous ink unit on the current line, and
        if an ink unit cannot be positioned adjacent to the previous ink unit on the current line without exceeding a boundary of the reflowable area, then positioning the ink unit at a beginning of a new line.

19. The one or more computer readable storage media recited in claim 18, wherein reflowing the ink includes, for each ink group, positioning an ink group at a specified distance from a previous ink group.

20. The one or more computer readable storage media recited in claim 18, wherein the method further comprises organizing a plurality of ink strokes into the one or more ink units.

21. The one or more computer readable storage media recited in claim 18, wherein each ink unit is a word and each ink group is a paragraph.

22. The one or more computer readable storage media recited in claim 18, wherein the method further comprises:

detecting that the reflowable area has been resized; and in response to detecting that the reflowable area has been resized, reflowing the ink.

* * * * *